C. A. PETTIT.
TRACTOR FOR PLOWS AND THE LIKE.
APPLICATION FILED APR. 17, 1913. RENEWED JUNE 7, 1917.
1,252,167.
Patented Jan. 1, 1918.
2 SHEETS—SHEET 2.
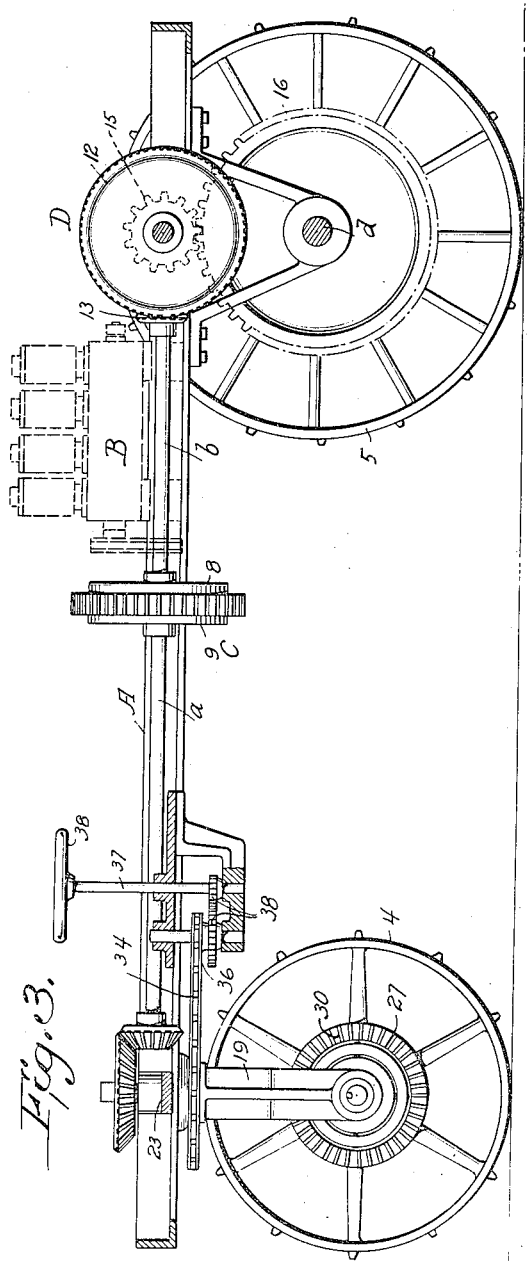
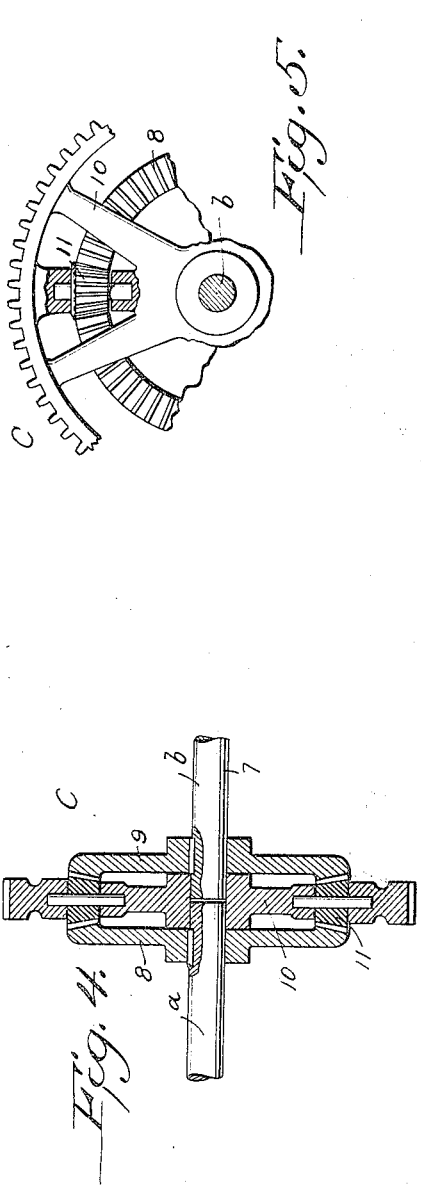
WITNESSES
INVENTOR
Charles A. Pettit
BY
ATTORNEYS

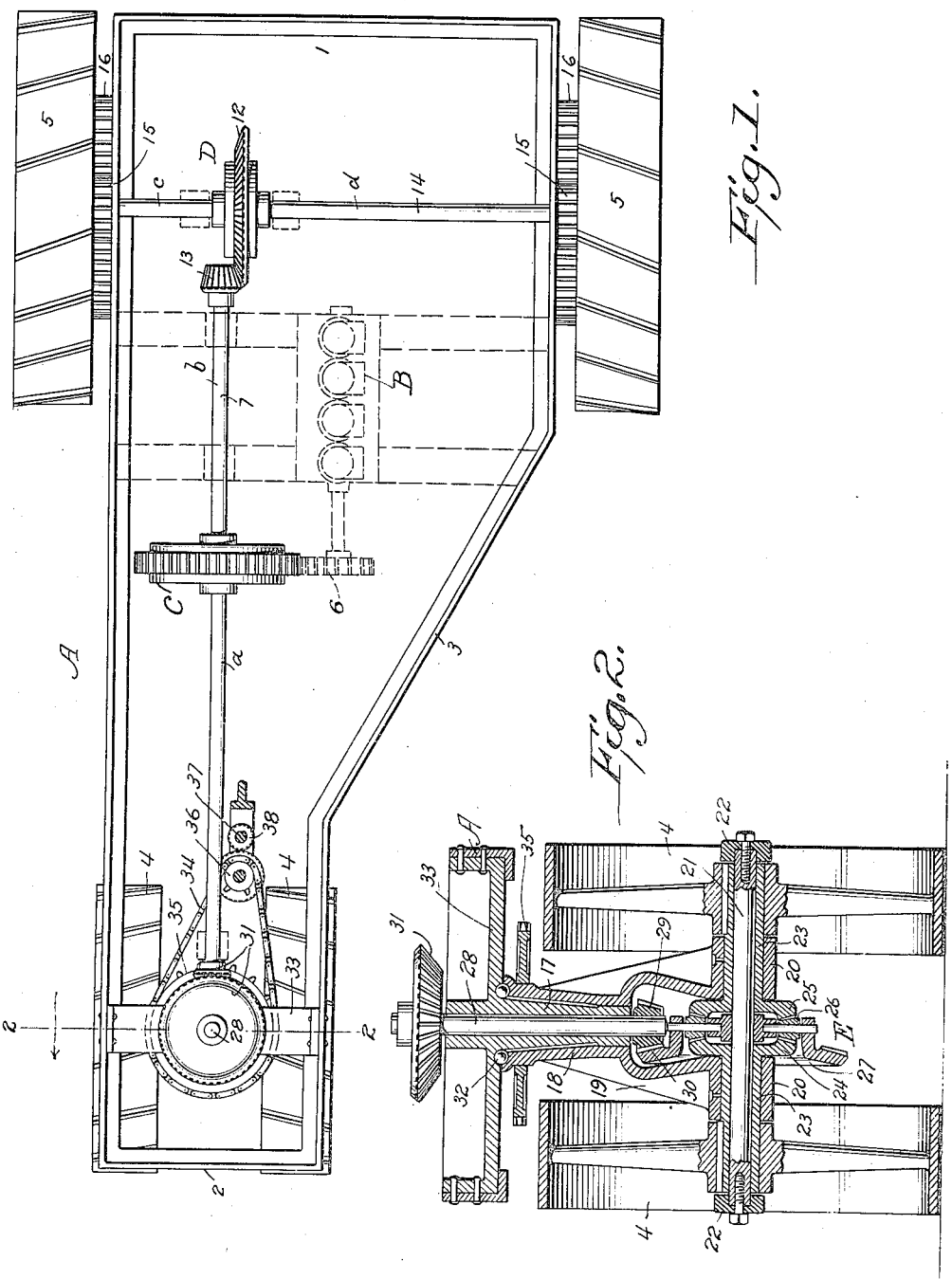

UNITED STATES PATENT OFFICE.

CHARLES A. PETTIT, OF ST. LOUIS, MISSOURI.

TRACTOR FOR PLOWS AND THE LIKE.

1,252,167. Specification of Letters Patent. Patented Jan. 1, 1918.

Application filed April 17, 1913, Serial No. 761,686. Renewed June 7, 1917. Serial No. 173,435.

*To all whom it may concern:*

Be it known that I, CHARLES A. PETTIT, a citizen of the United States, and a resident of St. Louis, in the county of St. Louis City and State of Missouri, have invented a new and Improved Tractor for Plows and the like, of which the following is a full, clear, and exact description.

This invention relates to a traction machine for use in connection with plows, cultivators and other tilling implements.

The principal object of the invention is the provision of a tractor in which all of its wheels are drivers or traction elements, and therefore novel and simple means are employed to impart power to those wheels that are used for steering or guiding the machine.

Another object of the invention is the provision of power transmitting mechanism between the explosive engine or prime mover and the various wheels, whereby the same surface speed of the front and rear wheels is obtained, even through such wheels be of different diameters.

Another object of the invention is the provision of a tractor of the character referred to which is of durable and substantial design, comparatively simple to manufacture, and adapted to be readily controlled by one man.

With such objects in view, and others as will appear as the description proceeds, the invention comprises various novel features of construction and arrangement of parts which will be more fully described hereinafter and set forth with particularity in the claim appended hereto.

In the accompanying drawings, which illustrate one embodiment of the invention, and wherein similar reference characters are employed to designate corresponding parts throughout the several views, Figure 1 is a plan view of the machine without plows, cultivators or other implements being shown;

Fig. 2 is a vertical transverse section on the line 2—2 of Fig. 1, drawn on an enlarged scale;

Fig. 3 is a longitudinal section of the machine;

Fig. 4 is an enlarged detail sectional view of the differential gear in the driving means between the front and rear axles; and Fig. 5 is a fragmentary side view of Fig. 4.

Referring to the drawings, A designates the frame or body of the tractor, the shape and size of which may be determined according to the work for which the machine is designed. In the present instance the frame A is wider at the front 1, and is narrow at the rear 2, there being an off-set portion 3 at one side of the frame where the plow, cultivator, or the like will be carried. With this arrangement the rear wheels 4 will travel on the landside or even ground. The rear wheels are of such diameter as to lie under the frame A, while the front wheels 5 are of much greater diameter and are disposed laterally of the frame at each side.

Power is derived from a suitable prime mover, such, for instance, as an explosive engine B, which is suitably mounted on the frame A to supply power to all the wheels, and in actual practice the engine will operate through forward and reverse gearing for driving the machine in both directions, but for simplicity the reversing gear has been omitted from the drawings, and a pinion 6 on the shaft of the engine B meshes with the teeth carried by the differential gear C. If the engine is reversible of course a reversing gear is unnecessary. The differential gear C is braced between the two sections *a* and *b* of the shaft 7 in order to compensate for the different speeds of the front and rear wheels in turning the vehicle, as the rear wheels will describe much larger circles in making the turns than will the larger front wheels. It is possible for one front wheel to act practically as a pivot in making sharp turns, and consequently the rear wheels will describe circles of much greater radii than will the front wheels, other than the one which acts as a pivot, and to provide for this a differential gear is employed between the front and rear driving wheels.

The differential gearing C comprises the carrier 10 on which is mounted a plurality of bevel pinions 11 that mesh with the bevel gears 8 and 9 fastened respectively to the sections *a* and *b* of the shaft 7.

In order to provide for relatively different rates of rotative speed of the front wheels 5, as in turning the tractor, a differential gearing D is employed to transmit power to the traction wheels 5 from the shaft 7. This differential gearing D is constructed the same as the gearing shown in Figs. 4 and 5, with the exception that the periphery of the carrier 10 has beveling teeth 12 which mesh with the bevel gear pinion 13 on the front section $b$ of the shaft 7. The two sections $c$ and $d$ of the transverse shaft 14 are each provided at their outer ends with small gears 15 which mesh with large gears 16 fastened to or rigidly connected with the traction wheels 5. While the shaft 7 rotates at a given speed the sections $c$ and $d$ can have different speeds while the machine is turning a curve.

The wheels 4 serve for steering the machine, and as power is also applied to these wheels for driving the machine, a special manner of mounting the wheels is employed. On the rear of the machine is rigidly secured a depending post or king bolt 17 which extends into a central upwardly-extending socket 18 on the yoke 19. Through the bearings 20 of the yoke extends an axle 21, which has caps or equivalent devices 22 on its ends to retain the rear steering wheels 4 in place. Each wheel is keyed to a sleeve or tubular axle 23 that surrounds the axle shaft 21 and rotates in its bearing 20, and the inner ends of the sleeves 23 are connected with driving means through a differential gearing E. This gearing comprises miter gears 24 and 25 on the tubular axles or sleeves 23, respectively, and meshing with these gears 24 and 25 are bevel pinions 26 carried by a rotating element or carrier 27. This carrier 27 is rotated by a vertical shaft 28 disposed in the king bolt 17, there being on the lower end of the shaft 28 a bevel pinion 29, which meshes with gear teeth 30 on the carrier 27. The shaft 28 is in turn rotated by the rear section A of the longitudinal guide shaft 7 through bevel gearing 31. To reduce friction between the parts 17 and 18, anti-friction balls 32 are interposed between the king post carrying cross bar 33 of the frame and the upper end of the socket 18, as clearly shown in Fig. 2. The steering is effected by a sprocket chain 34 passing around a sprocket wheel 35 on the yoke 19, and passing around the small sprocket wheel 36. The sprocket wheel 36 is rotated by a steering wheel post 37 that is connected by gears 38 with the sprocket wheel 36. The driver turns the steering post 37 by the grip wheel 38 for the purpose of steering the machine, but this does not interfere with the application of power to both wheels 4 during the steering operation.

From the foregoing description taken in connection with the accompanying drawings, the advantages of the method of operation and of the apparatus shown will be readily understood by those skilled in the art to which the invention appertains, and while I have described the best embodiment thereof I desire to have it understood that the apparatus shown is merely illustrative, and that such changes may be made when desired as are within the scope of the appended claim.

Having thus described my invention, I claim as new and desire to secure by Letters Patent:

In a traction machine, a frame, a tubular and downwardly projecting king post on the underside of the frame, a yoke having a socket extending to the under side of the frame and in which the king post is mounted and provided with bearings at its lower end, tubular axles mounted in the bearings of the yoke and provided with gear wheels at their inner ends, wheels on the axles, means for securing the wheels on the axles, a toothed carrier mounted between the gear wheels of the axles, pinions mounted on the carrier and meshing with the gear wheels of the axles, a vertical shaft mounted in the king post and provided at its lower end with a pinion meshing with the carrier, means for operating said shaft, a steering post, and means for turning the yoke from said steering post.

In testimony whereof I have signed my name to this specification in the presence of two subscribing witnesses.

CHARLES A. PETTIT.

Witnesses:
WILFRED A. GRUNDMEYER,
CORA GRUNDMEYER.